(12) United States Patent
Nishiyama et al.

(10) Patent No.: US 9,950,693 B2
(45) Date of Patent: Apr. 24, 2018

(54) WIRELESS COMMUNICATION SYSTEM

(71) Applicant: TOYOTA JIDOSHA KABUSHIKI KAISHA, Toyota-shi, Aichi-ken (JP)

(72) Inventors: Shigeki Nishiyama, Toyota (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/498,824

(22) Filed: Apr. 27, 2017

(65) Prior Publication Data
US 2017/0327085 A1 Nov. 16, 2017

(30) Foreign Application Priority Data
May 12, 2016 (JP) .................................. 2016-096225

(51) Int. Cl.
*G05B 19/00* (2006.01)
*B60R 25/24* (2013.01)
*H04W 12/06* (2009.01)
*H04W 12/08* (2009.01)

(52) U.S. Cl.
CPC ........... *B60R 25/241* (2013.01); *H04W 12/06* (2013.01); *H04W 12/08* (2013.01)

(58) Field of Classification Search
CPC ..... B60R 25/241; H04W 12/06; H04W 12/08
USPC ............................................. 340/5.61; 701/2
See application file for complete search history.

(56) References Cited

U.S. PATENT DOCUMENTS

| 2004/0236701 | A1* | 11/2004 | Beenau ............. G06F 17/30725 705/64 |
| 2005/0237152 | A1 | 10/2005 | Nakashima et al. |
| 2012/0310447 | A1* | 12/2012 | Toki ........................ B60R 25/24 701/2 |
| 2015/0274126 | A1 | 10/2015 | Nishiyama |
| 2017/0096140 | A1* | 4/2017 | Woodley ............. B60W 30/143 |

FOREIGN PATENT DOCUMENTS

| JP | 2005-307646 A | 11/2005 |
| JP | 2015-190273 A | 11/2015 |

* cited by examiner

Primary Examiner — Ojiako O Nwugo
(74) Attorney, Agent, or Firm — Oliff PLC

(57) ABSTRACT

A wireless communication system includes an in-vehicle device mounted on a vehicle; and a portable device that can be carried by a user. The in-vehicle device includes a first sending unit configured to intermittently and wirelessly send an identification code of the vehicle or the in-vehicle device; and a detection unit configured to detect a presence of the portable device by receiving a response signal wirelessly sent from the portable device. The portable device includes a receiving antenna configured to receive the identification code; a first verification unit configured to verify the identification code, received by the receiving antenna, with a code registered in the portable device; and a sending control unit configured to wirelessly send the response signal if the verification by the first verification unit is successful and not to send the response signal if the verification by the first verification unit is not successful.

8 Claims, 6 Drawing Sheets

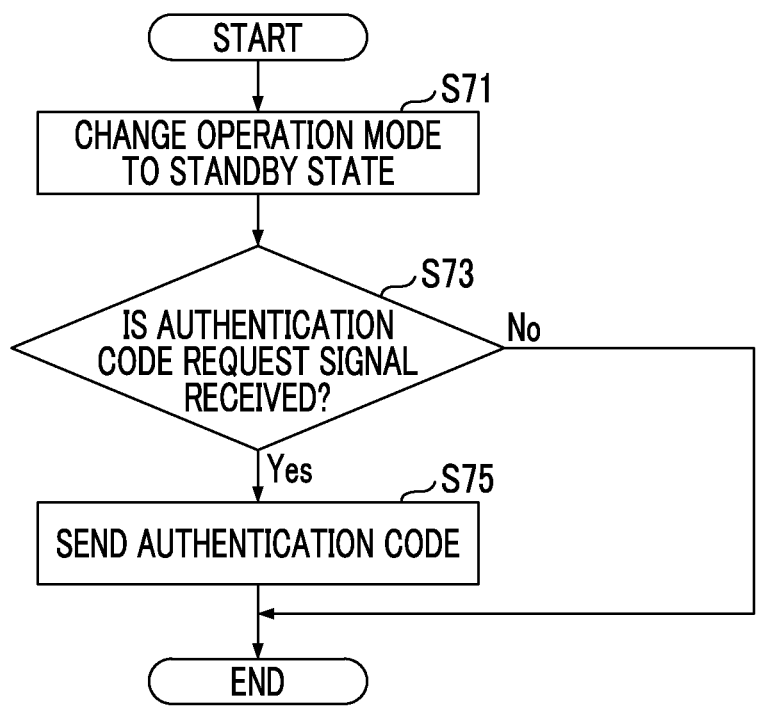

WIRELESS COMMUNICATION SYSTEM

INCORPORATION BY REFERENCE

The disclosure of Japanese Patent Application No. 2016-096225 filed on May 12, 2016 including the specification, drawings and abstract is incorporated herein by reference in its entirety.

BACKGROUND

1. Technical Field

The present disclosure relates to a wireless communication system.

2. Description of Related Art

In the related art, an unlocking system, which includes an unlocking control device that is mounted on a vehicle and a portable device that can be carried by a user, is known (for example, see Japanese Patent Application Publication No. 2005-307646 (JP 2005-307646 A)). In this unlocking system, the unlocking control device intermittently and wirelessly sends an activation request signal to the outside of the vehicle and, upon receiving the activation request signal wirelessly sent from the unlocking control device, the portable device wirelessly sends a response signal responsive to the activation request signal. Upon receiving the response signal wirelessly sent from the portable device, the unlocking control device wirelessly sends an ID request signal to acquire an ID code from the portable device. The unlocking control device verifies the ID code, acquired from the portable device, with the ID code pre-registered in the vehicle and, if they match, unlocks the vehicle door.

SUMMARY

In the related art, the unlocking control device intermittently and wirelessly sends an activation request signal and receives a response signal, wirelessly sent from the portable device, to detect that the portable device is present. However, the portable device does not distinguish between an activation request signal, wirelessly sent from the host vehicle whose pre-registered ID code matches the ID code of the portable device, and an activation request signal wirelessly sent from other vehicles whose pre-registered ID codes do not match the ID code of the portable device. This means that the portable device wirelessly sends a response signal also in response to activation request signals wirelessly sent from the other vehicles, with the result that power is consumed wastefully.

In view of the foregoing, the present disclosure provides a wireless communication system that can reduce power consumption.

According to a first aspect of the present disclosure, a wireless communication system includes an in-vehicle device mounted on a vehicle; and a portable device that can be carried by a user. The in-vehicle device includes a first sending unit configured to intermittently and wirelessly send an identification code of the vehicle or the in-vehicle device to an outside of the vehicle; and a detection unit configured to detect a presence of the portable device by receiving a response signal wirelessly sent from the portable device. The portable device includes a receiving antenna configured to receive the identification code; a first verification unit configured to verify the identification code, received by the receiving antenna, with a code registered in the portable device; and a sending control unit configured to wirelessly send the response signal if the verification by the first verification unit is successful and not to send the response signal if the verification by the first verification unit is not successful.

According to the configuration described above, the in-vehicle device intermittently and wirelessly sends the identification code of the vehicle or the in-vehicle device to the outside of the vehicle. Upon receiving the identification code, wirelessly sent from the in-vehicle device, by the receiving antenna, the portable device verifies the identification code, received by the receiving antenna, with the code registered in the portable device. If the verification of the identification code received by the receiving antenna is successful, the portable device wirelessly sends the response signal. Therefore, the in-vehicle device mounted in the vehicle for which the verification of the identification code is successful can detect the presence of the portable device by the detection unit. On the other hand, if the verification of the identification code, received by the receiving antenna, is not successful, the portable device does not wirelessly send the response signal. Therefore, it is possible to eliminate the need for wasteful power consumption that would otherwise be required when the portable device wirelessly sends the response signal to a vehicle for which the verification of the identification code is not successful.

According to the aspect described above, the in-vehicle device may be configured to perform predetermined control if the presence of the portable device is detected by the detection unit and not to perform the predetermined control if the presence of the portable device is not detected by the detection unit.

According to the configuration described above, if the verification of the identification code received by the receiving antenna is successful, the portable device wirelessly sends the response signal and, therefore, the in-vehicle device can detect the presence of the portable device by the detection unit. Therefore, if the presence of the portable device is detected by the detection unit, the in-vehicle device mounted in a vehicle, for which the verification of the identification code is successful, can perform the predetermined control. On the other hand, if the verification of the identification code received by the receiving antenna is not successful, the portable device does not wirelessly send the response signal and, therefore, the in-vehicle device does not detect the presence of the portable device by the detection unit. If the presence of the portable device is not detected by the detection unit, the in-vehicle device does not perform the predetermined control. Therefore, it is possible to eliminate the need for wasteful power consumption that would otherwise be required when the in-vehicle device mounted on a vehicle, for which verification of the identification code is not successful, performs the predetermined control.

According to the aspect described above, the in-vehicle device may be configured to further include a second sending unit configured to wirelessly send a request signal to the portable device if the presence of the portable device is detected by the detection unit and not to send the request signal if the presence of the portable device is not detected by the detection unit; and a second verification unit configured to verify an authentication code received from the portable device with a code registered in the in-vehicle device. The sending control unit may be configured not to send the authentication code if the request signal is not received and to wirelessly send the authentication code if the request signal is received. The second verification unit may be configured to determine whether to permit or prohibit locking or unlocking of a door of the vehicle according to the verification result of the authentication code.

According to the configuration described above, if the presence of the portable device is detected by the detection unit, the in-vehicle device wirelessly sends a request signal to the portable device and, when the request signal is received, the portable device wirelessly sends the authentication code. The in-vehicle device verifies the authentication code, received from the portable device, with the code registered in the in-vehicle device and determines whether to permit or prohibit the unlock/unlocking of the door of the vehicle according to the result of the verification of the authentication code. Therefore, if the presence of the portable device is detected by the detection unit (that is, if the verification of the identification code received by the receiving antenna is successful), the in-vehicle device mounted in a vehicle, for which the verification of the identification code is successful, can determine whether to permit or prohibit the locking/unlocking of the door of the vehicle.

On the other hand, according to the configuration described above, if the presence of the portable device is not detected by the detection unit, the in-vehicle device does not wirelessly send the request signal and, therefore, the portable device does not receive the request signal. Since the portable device does not wirelessly send the authentication code if the request signal is not received, the verification of the authentication code is not performed and the whether to permit or prohibit the locking/unlocking of the door of the vehicle is not determined.

In this way, if the presence of the portable device is not detected by the detection unit (that is, if the verification of the identification code received by the receiving antenna is not successful), the authentication code is not wirelessly sent. Therefore, it is possible to eliminate the need for wasteful power consumption that would otherwise be required when the portable device wirelessly sends the authentication code to a vehicle for which the verification of the identification code is not successful. In addition, since the authentication code is not wirelessly sent and, therefore, the authentication code is not verified, it is possible to eliminate the need for wasteful power consumption that would otherwise be required when the in-vehicle device, mounted on a vehicle for which the verification of the identification code is not successful, verifies the authentication code. In addition, since whether to permit or prohibit the locking/unlocking of the door of the vehicle is not determined, it is possible to eliminate the need for wasteful power consumption that would otherwise be required when the in-vehicle device, mounted on a vehicle for which verification of the identification code is not successful, determines whether to permit or prohibit the locking/unlocking of the door of the vehicle.

According to the aspect described above, the first verification unit may be configured to change an operation mode of the sending control unit from a standby state to a wake state, which is a state in which a current consumption is higher than a current consumption in the standby state and the response signal can be wirelessly sent, if the verification of the identification code is successful.

According to the aspect described above, the in-vehicle device may be configured to further include a locking/unlocking control unit configured to lock/unlock the door of the vehicle according to a result of determining whether to permit or prohibit the locking/unlocking of the door of the vehicle.

According to the aspect described above, the in-vehicle device may be configured to further include an operation detection unit configured to detect an operation by the user to lock or unlock the door of the vehicle and the locking/unlocking control unit may be configured to output an unlocking request signal or a locking request signal for the door of the vehicle if the locking/unlocking of the door of the vehicle is permitted by the second verification unit and if the operation is detected by the operation detection unit.

According to one aspect of the present disclosure, power consumption can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart showing an example of authentication code sending control performed by a portable device.

DETAILED DESCRIPTION OF EMBODIMENTS

An embodiment of the present disclosure will be described below with reference to the drawings.

Figure 1:
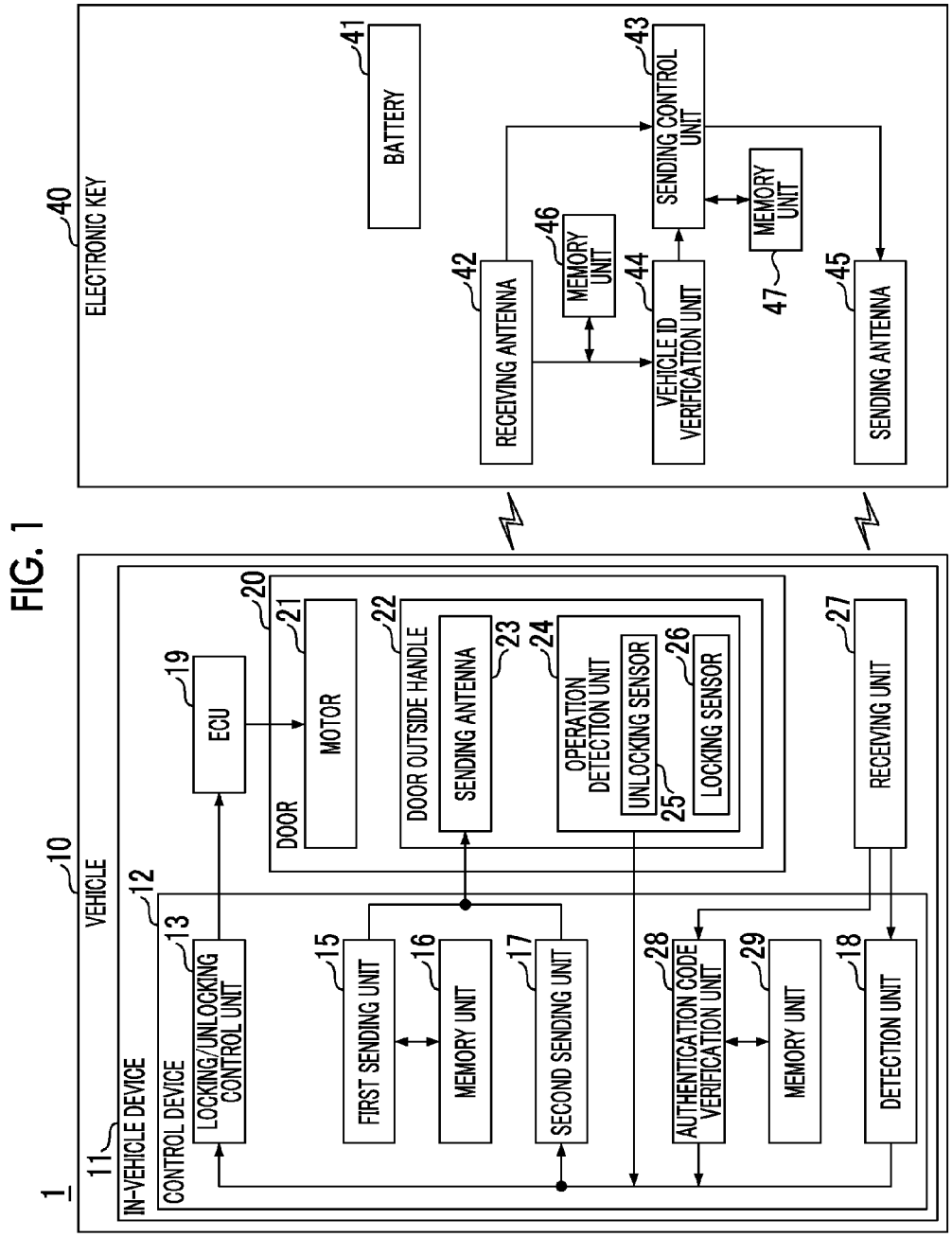
FIG. 1 is a diagram showing an example of a configuration of a wireless communication system.

FIG. 1 is a diagram showing an example of a configuration of a wireless communication system 1. The wireless communication system 1, which includes an in-vehicle device 11 and an electronic key 40, is an example of a system capable of detecting the presence of the electronic key 40 by wireless communication between the in-vehicle device 11 and the electronic key 40. The wireless communication system 1 may be referred to as a polling system in some cases. The in-vehicle device 11, mounted on a vehicle 10, is composed of one or more parts. The electronic key 40 is an example of a portable device that can be carried by a user.

The in-vehicle device 11 has, for example, a control device 12, a sending antenna 23, and a receiving unit 27. The control device 12 has, for example, a first sending unit 15, a memory unit 16, and a detection unit 18.

The first sending unit 15 wirelessly sends the vehicle ID to the outside of the vehicle 10 intermittently via the sending antenna 23. The vehicle ID, which represents the identification code of the vehicle 10 or the in-vehicle device 11, is set to a value different for each vehicle. Since the vehicle ID is different for each vehicle, the vehicle ID, when referenced, allows vehicles to be identified individually.

The memory unit 16 pre-stores the vehicle ID unique to the host vehicle or to the in-vehicle device 11 mounted on the host vehicle.

The first sending unit 15 reads the vehicle ID, unique to the host vehicle or to the in-vehicle device 11 mounted on the host vehicle, from the memory unit 16 and sends a first request signal Rq1, which includes the vehicle ID that has been read, to the outside of the vehicle 10 intermittently via the sending antenna 23 by radio waves in the LF band. LF is an abbreviation for Low Frequency. The first request signal Rq1 may be referred to as a polling signal.

The receiving unit 27 receives a first response signal Rs1 responsive to the first request signal Rq1. The receiving unit 27 receives the first response signal Rs1, wirelessly sent by radio waves (RF signal) in the UHF band, from a sending antenna 45 of the electronic key 40. The receiving unit 27 is, for example, a receiving circuit, such as a tuner, for receiving radio waves in the UHF band. UHF is an abbreviation for Ultra High Frequency, and RF is an abbreviation for Radio Frequency.

The detection unit 18 detects the presence of the electronic key 40 by receiving the first response signal Rs1 via the receiving unit 27. The detection unit 18 determines whether the first response signal Rs1 is received after the first request signal Rq1 was sent. If the first response signal Rs1 is received by the receiving unit 27, the detection unit 18 determines that the electronic key 40 is present in the vehicle-exterior detection area formed by the radio waves sent from the sending antenna 23. On the other hand, if the first response signal Rs1 is not received by the receiving unit 27, the detection unit 18 determines that the electronic key 40 is not present in the vehicle-exterior detection area.

On the other hand, the electronic key 40 has, for example, a battery 41, a receiving antenna 42, a vehicle ID verification unit 44, a memory unit 46, a sending antenna 45, a sending control unit 43, and a memory unit 47.

The battery 41 is an example of a power supply of the electronic key 40. For example, the battery 41 supplies power to the vehicle ID verification unit 44, the memory unit 46, the sending control unit 43, and the memory unit 47.

The receiving antenna 42 is an antenna capable of sending or receiving a signal to or from the sending antenna 23 of the in-vehicle device 11 by radio waves in the LF band. The receiving antenna 42 receives the first request signal Rq1 sent from the sending antenna 23 of the in-vehicle device 11. The first request signal Rq1 includes the vehicle ID.

The vehicle ID verification unit 44 verifies the vehicle ID, included in the first request signal Rq1 received by the receiving antenna 42, with the code registered in the electronic key 40. For example, the vehicle ID verification unit 44 compares the vehicle ID, received by the receiving antenna 42, with the vehicle ID pre-registered in the memory unit 46 and, if they match, determines that verification of the vehicle ID is successful. On the other hand, if they do not match, the vehicle ID verification unit 44 determines that verification of the vehicle ID is not successful. The vehicle ID verification unit 44 is an example of a first verification unit.

The memory unit 46 stores in advance the vehicle ID unique to the host vehicle or to the in-vehicle device 11 mounted on the host vehicle. The vehicle ID stored in the memory unit 46 is the same as the vehicle ID stored in the memory unit 16 of in-vehicle device 11 of the host vehicle. For example, when the vehicle is shipped from the factory or delivered to a dealer, the vehicle ID read from the memory unit 16 is sent to the authentic electronic key 40 of the host vehicle by the first sending unit 15 via the sending antenna 23. The vehicle ID received by the receiving antenna 42 is then registered in the memory unit 46.

The sending antenna 45 is a send-only antenna capable of sending the first response signal Rs1, responsive to the first request signal Rq1, to the receiving unit 27 of the in-vehicle device 11 by radio waves (RF signals) in the UHF band.

When verification by the vehicle ID verification unit 44 is successful, the sending control unit 43 wirelessly sends the first response signal Rs1, responsive to the first request signal Rq1, to the outside of the electronic key 40 via the sending antenna 45. On the other hand, if verification by the vehicle ID verification unit 44 is not successful, the sending control unit 43 does not wirelessly send the first response signal Rs1, responsive to the first request signal Rq1, to the outside of the electronic key 40 via the sending antenna 45. The sending control unit 43 is configured, for example, by an integrated circuit.

Figure 2:
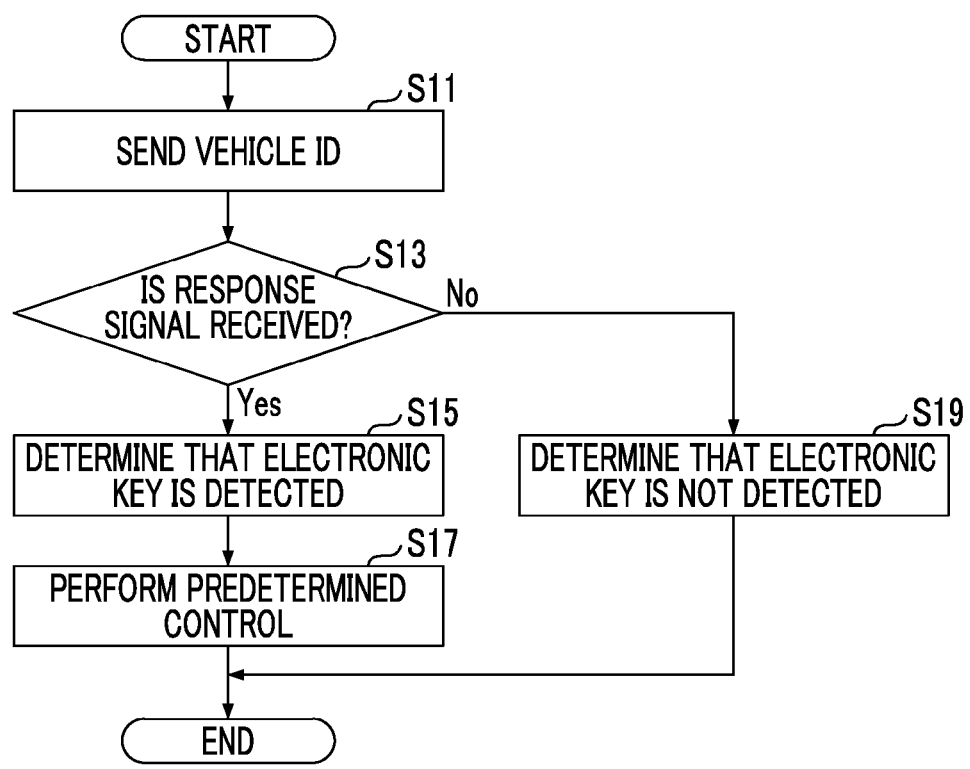
FIG. 2 is a flowchart showing an example of the operation of an in-vehicle device.

FIG. 2 is a flowchart showing an example of the operation of the in-vehicle device 11. The first sending unit 15 of the in-vehicle device 11 sends the vehicle ID intermittently (for example, at predetermined periodic sending intervals). The in-vehicle device 11 executes a series of processing steps, from the start to the end, shown in FIG. 2 each time the vehicle ID is sent.

In step S11, the first sending unit 15 wirelessly sends the first request signal Rq1, which includes the vehicle ID, via the sending antenna 23.

In step S13, the detection unit 18 determines whether the receiving unit 27 receives the first response signal Rs1 within a predetermined time T1 from the time the first request signal Rq1, which includes the vehicle ID, was sent.

If the first response signal Rs1 is received by the receiving unit 27 within the predetermined time T1, the detection unit 18 determines that the electronic key 40 is present in the vehicle-exterior detection area formed by the radio waves sent from the sending antenna 23 (step S15). If the presence of the electronic key 40 is detected by the detection unit 18 in step S15, the control device 12 executes predetermined control (step S17).

On the other hand, if the first response signal Rs1 is not received by the receiving unit 27 within the predetermined time T1, the detection unit 18 determines that the electronic key 40 is not present in the vehicle-exterior detection area formed by the radio wave sent from the sending antenna 23 (step S19). If the presence of the electronic key 40 is not detected by the detection unit 18 in step S19, the control device 12 does not execute the predetermined control (control executed in step S17).

Figure 3:
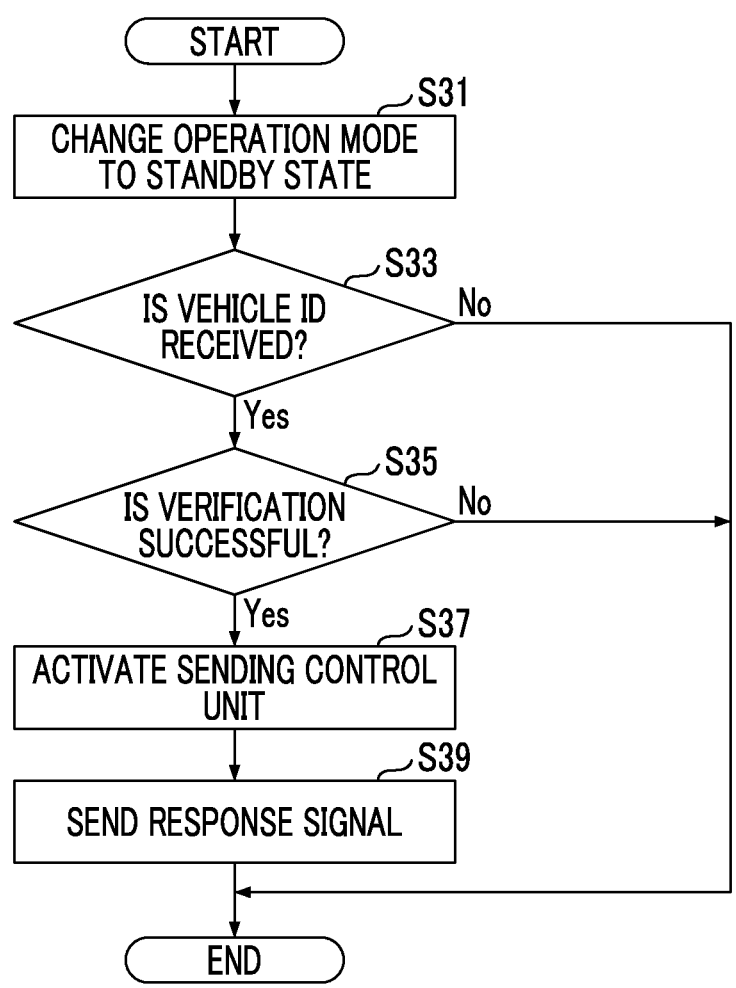
FIG. 3 is a flowchart showing an example of the operation of a portable device.

FIG. 3 is a flowchart showing an example of the operation of the electronic key 40. The electronic key 40 performs a series of processing steps, from the start to the end, shown in FIG. 3 at periodic intervals.

In step S31, the sending control unit 43 changes its own operation mode to the standby state (also referred to as the sleep state) in which the sending control unit 43 waits for the radio wave of the signal sent from the in-vehicle device 11.

In step S33, the vehicle ID verification unit 44 determines whether the first request signal Rq1, which includes the vehicle ID, is received by the receiving antenna 42.

If it is determined in step S33 that the first request signal Rq1, which includes the vehicle ID, is received by the receiving antenna 42, the vehicle ID verification unit 44 verifies the vehicle ID included in the first request signal Rq1 received by the receiving antenna 42 (step S35).

If the verification of the vehicle ID is successful in step S35, the vehicle ID verification unit 44 changes the operation mode of the sending control unit 43 from the standby state to the wake state to activate the sending control unit 43 (step S37).

In step S39, the sending control unit 43, activated from the standby state, wirelessly sends the first response signal Rs1, responsive to the first request signal Rq1, to the outside of the electronic key 40 via the sending antenna 45. At this time, it is preferable that the sending control unit 43 wirelessly send the first response signal Rs1 that includes the key ID unique to its own electronic key 40. The key ID, if included in the first response signal Rs1, allows the detection unit 18 of the in-vehicle device 11 to identify the key ID of the electronic key 40 that is present in the vehicle-exterior detection area formed by the radio waves sent from the sending antenna 23.

On the other hand, if the first request signal Rq1 is not received (No in step S33) or if the verification of the vehicle ID, which is included in the first request signal Rq1, is not successful (No in step S35), the vehicle ID verification unit 44 does not activate the sending control unit 43. In this case, since the sending control unit 43 is not activated, the first response signal Rs1 is not wirelessly sent to the outside the electronic key 40.

Figure 4:
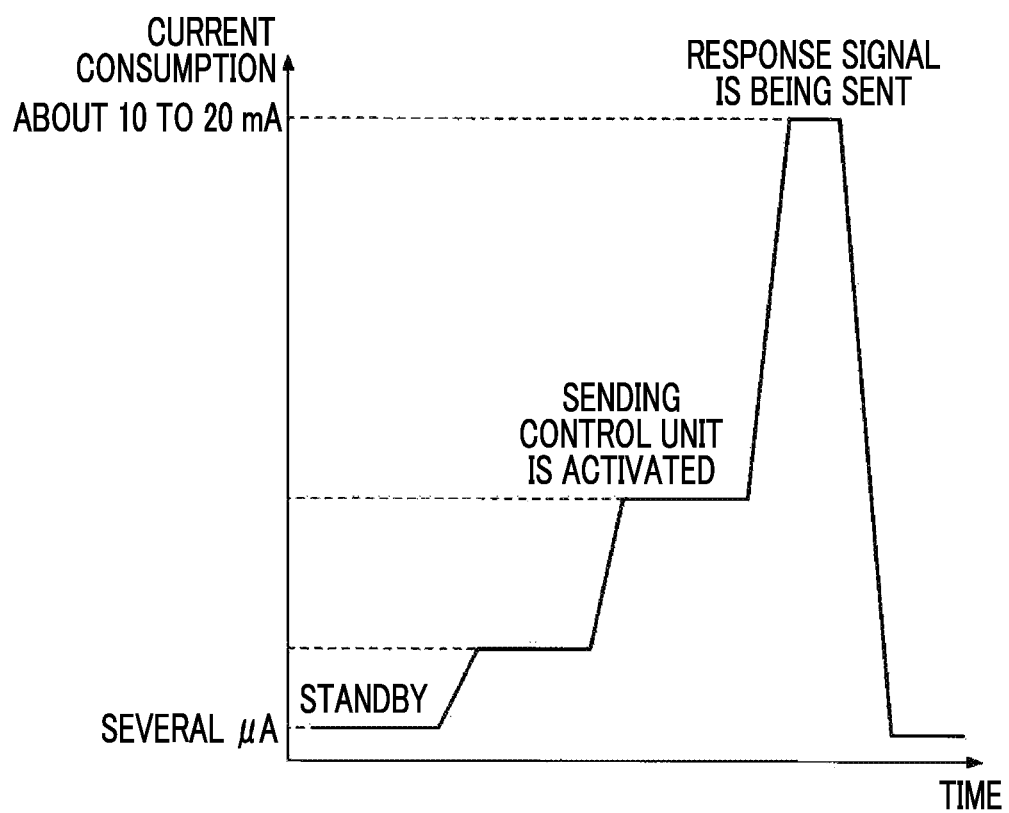
FIG. 4 is a diagram showing an example of a change in the current consumption of a portable device.

FIG. 4 is a diagram showing an example of a change in the current consumption of the electronic key 40. The current consumption when the vehicle ID verification unit 44 verifies the vehicle ID in step S35 in FIG. 3 rises slightly compared with that in the standby state in step S31 in FIG. 3. The current consumption when the sending control unit 43 is activated in step S37 in FIG. 3 rises compared with that when the vehicle ID verification unit 44 verifies the vehicle ID in step S35 in FIG. 3. The current consumption when the sending control unit 43 sends the first response signal Rs1 in step S39 in FIG. 3 further rises compared with that when the sending control unit 43 activated in step S37 in FIG. 3 does not send the first response signal Rs1. When the sending of the first response signal Rs1 is completed, the operation mode of the sending control unit 43 is changed from the wake state to the standby state (see step S31 in FIG. 3).

In the electronic key 40, if the verification of the vehicle ID received by the receiving antenna 42 is not successful, the sending control unit 43 is not activated and the first response signal Rs1 is not sent. Therefore, the current consumption of the electronic key 40 can be prevented from rising as in the case shown in FIG. 4. More specifically, the current consumption of the electronic key 40 can be prevented from becoming higher than the current consumption when the vehicle ID verification unit 44 verifies the vehicle ID in step S35 in FIG. 3. In this way, if the verification of the vehicle ID received by the receiving antenna 42 is not successful, the electronic key 40 can prevent the generation of wasteful power consumption that will be caused when the sending control unit 43 is activated and the first response signal Rs1 is sent.

In addition, if the presence of the electronic key 40 is not detected by the detection unit 18 (that is, the verification of the vehicle ID received by the receiving antenna 42 is not successful), the control device 12 does not perform the predetermined control as shown in FIG. 2. Therefore, it is possible to eliminate the need for wasteful power consumption that would otherwise be required by the predetermined control performed by the in-vehicle device 11 mounted on a vehicle for which the verification of the identification code is not successful.

One specific example of the predetermined control is the locking/unlocking control for controlling the locking or unlocking of a door 20 (see FIG. 1) of the vehicle 10.

The in-vehicle device 11 has an ECU 19 and a motor 21 to realize locking/unlocking control, for example, as shown in FIG. 1. The control device 12 includes an operation detection unit 24, a second sending unit 17, an authentication code verification unit 28, a memory unit 29, and a locking/unlocking control unit 13 for realizing the locking/unlocking control, for example, as shown in FIG. 1. The control device 12 is an electronic control unit (ECU) having a microcomputer that realizes the locking/unlocking control unit 13, the first sending unit 15, the second sending unit 17, the authentication code verification unit 28, and the detection unit 18.

The operation detection unit 24 and the sending antenna 23 are provided, for example, in a door outside handle 22 provided outside the door 20. The door outside side handle 22 is a contact operation unit on which a user performs a contact operation (for example, a contact operation such as gripping or pushing) for unlocking or locking the door 20 from the outside of the vehicle 10.

The operation detection unit 24 detects an operation performed by a user beside the door 20 of the vehicle 10 for unlocking or locking the door 20. In the description below, the operation performed by a user beside the door 20 of the vehicle 10 for unlocking or locking the door 20 is simply referred to as "user operation" in some cases. For example, the operation detection unit 24 may be a unit that detects a contact operation on the door outside handle 22 as a user operation or may be a unit that detects an operation on a button on the door 20 as a user operation. In addition, the operation detection unit 24 may also be a unit that detects a user operation, based on the captured result of a camera or the received result of the reflected waves of transmitted radio waves.

The operation detection unit 24 includes, for example, an unlocking sensor 25 and a locking sensor 26. The unlocking sensor 25 detects an operation for unlocking the door 20 (unlocking operation), and the locking sensor 26 detects an operation for locking the door 20 (locking operation). Alternatively, the operation detection unit 24 may be a unit that detects a user operation, detected in the locked state of the door 20, as an unlocking operation, or may be a unit that detects a user operation, detected in the unlocked state of the door 20, as a locking operation.

If the presence of the electronic key 40 is detected by the detection unit 18, the second sending unit 17 wirelessly sends the request signal for the electronic key 40 to the outside of the vehicle 10 via the sending antenna 23. On the other hand, if the presence of the electronic key 40 is not detected by the detection unit 18, the second sending unit 17 does not wirelessly send the request signal for the electronic key 40 to the outside of the vehicle 10 via the sending antenna 23.

For example, the second sending unit 17 sends a second request signal Rq2 (an example of the request signal for the electronic key 40), which requests the electronic key 40 to send an authentication code, via the sending antenna 23 with radio waves in the LF band. For example, when the electronic key 40 is authenticated by the challenge-response authentication method, the second request signal Rq2 corresponds to a "challenge", and the authentication code corresponds to a "response".

If the second request signal Rq2 is not received by the receiving antenna 42, the sending control unit 43 of the electronic key 40 does not wirelessly send the authentication code. On the other hand, if the second request signal Rq2 is received by the receiving antenna 42, the sending control unit 43 wirelessly sends the authentication code. For example, when the challenge-response authentication is used, the sending control unit 43 creates the authentication code (response) using the second request signal Rq2 (challenge), received by the receiving antenna 42, and the personal identification code registered in advance in the memory unit 47. The sending control unit 43 wirelessly sends the second response signal Rs2, which includes the created authentication code, via the sending antenna 45.

The receiving unit 27 receives the second response signal Rs2 responsive to the second request signal Rq2. The receiving unit 27 receives the second response signal Rs2 wirelessly sent from the sending antenna 45 of the electronic key 40 with a radio wave (RF signal) in the UHF band.

The authentication code verification unit 28 verifies the authentication code, included in the second response signal Rs2 received by the receiving unit 27, with the code registered in the in-vehicle device 11. For example, when challenge-response authentication is used, the authentication code verification unit 28 creates (registers) an authentication code, using the second response signal Rs2 (challenge), received by the receiving unit 27, and the personal identification code, registered in the memory unit 29, and verifies the authentication code, received by the receiving unit 27, with the created (registered) authentication code. If the both codes match, the authentication code verification unit 28 determines that verification of the authentication code is successful. On the other hand, if the both codes do not match, the authentication code verification unit 28 determines that the verification of the authentication code is not successful. The authentication code verification unit 28 is an example of a second verification unit.

Figure 5:
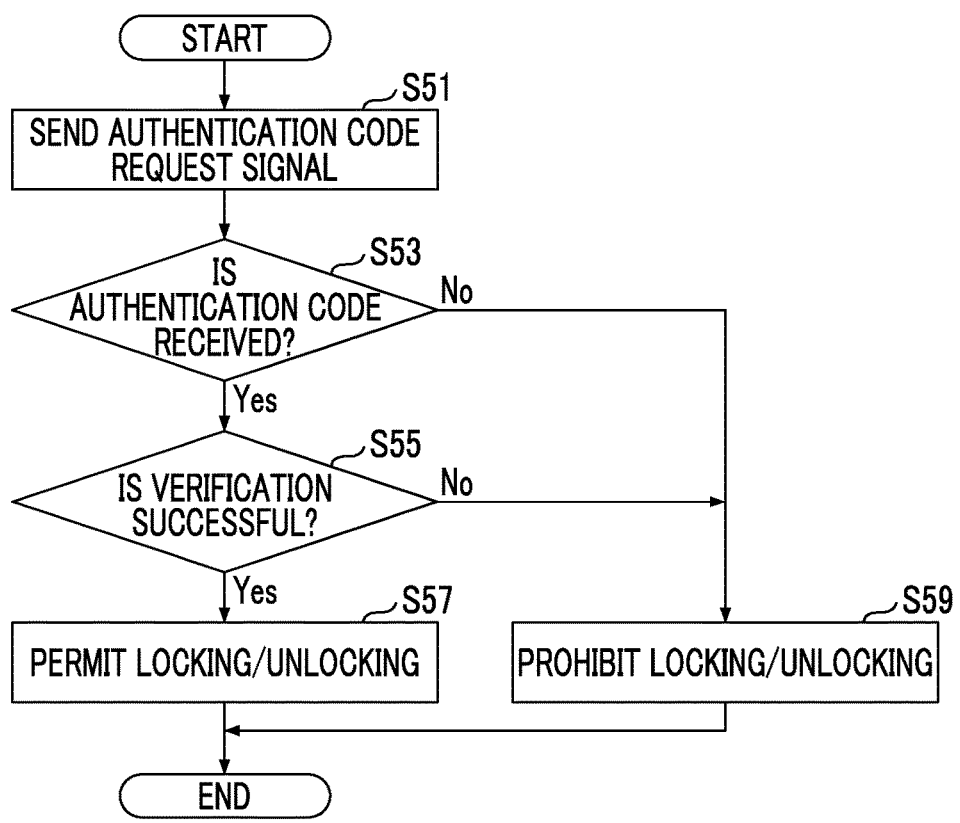
FIG. 5 is a flowchart showing an example of locking/unlocking control performed by an in-vehicle device.

FIG. 5 is a diagram showing an example of locking and unlocking control performed by the in-vehicle device 11. The locking and unlocking control shown in FIG. 5 shows an example of the predetermined control performed in step S17 in FIG. 2.

In step S51, the second sending unit 17 wirelessly sends the second request signal Rq2, which requests the electronic key 40 to send the authentication code, via the sending antenna 23. At this time, the second sending unit 17 wirelessly sends the second request signal Rq2 that includes the key ID included in the first response signal Rs1 received in step S13 in FIG. 2.

In step S53, the authentication code verification unit 28 determines whether the receiving unit 27 has received the second response signal Rs2, which includes the authentication code, within a predetermined time T2 from the time the second request signal Rq2 was sent.

If it is determined in step S53 that the second response signal Rs2, which includes the authentication code, is received by the receiving unit 27 within the predetermined time T2, the authentication code verification unit 28 verifies the authentication code included in the second response signal Rs2 received by the receiving unit 27 (step S55).

If the verification of the authentication code is successful in step S55, the authentication code verification unit 28 permits the locking/unlocking of the door 20 (step S57).

On the other hand, if the second response signal Rs2 is not received by the receiving unit 27 (No in step S53) or if the verification of the authentication code included in the second response signal Rs2 is not successful (No in step S55), the authentication code verification unit 28 prohibits the locking/unlocking of the door 20 (step S59).

In this way, the authentication code verification unit 28 determines whether to permit or prohibit the locking/unlocking of the door 20 according to the verification result of the authentication code. The locking/unlocking control unit 13 locks and unlocks the door 20 according to the result of determining whether to permit or prohibit the locking/unlocking of the door 20. That is, the in-vehicle device 11 mounted on the vehicle, for which the verification of the identification code is successful, can determine whether to permit or prohibit the locking/unlocking of the door 20.

For example, if the locking/unlocking of the door 20 is permitted by the authentication code verification unit 28 and if a user operation is detected by the operation detection unit 24, the locking/unlocking control unit 13 (see FIG. 1) outputs an unlocking request signal or a locking request signal for the door 20 to the ECU 19. The ECU 19 operates the motor 21 in a direction to switch the door 20 from the locked state to the unlocked state according to the unlocking request signal, and in a direction to switch the door 20 from the unlocked state to the locked state according to the locking request signal. On the other hand, if the locking/unlocking of the door 20 is prohibited by the authentication code verification unit 28, the locking/unlocking control unit 13 prohibits the ECU 19 from operating the motor 21 for locking/unlocking the door 20.

FIG. 6 is a flowchart showing an example of authentication code sending control performed by the electronic key 40. The electronic key 40 performs a series of processing steps, from the start to the end, shown in FIG. 6 at periodic intervals.

In step S71, the sending control unit 43 changes its operation mode to the standby state (also referred to as the sleep state) in which the sending control unit 43 waits for the signal of radio waves sent from the in-vehicle device 11.

In step S73, the sending control unit 43 determines whether the second request signal Rq2 (authentication code request signal), which includes its own key ID, is received by the receiving antenna 42.

If it is determined in step S73 that the second request signal Rq2, which includes its own key ID, is received by the receiving antenna 42, the sending control unit 43 wirelessly sends the second response signal Rs2, which includes the authentication code, via the sending antenna 45 (step S75).

On the other hand, if it is determined in step S73 that the second request signal Rq2, which includes its own key ID, is not received by the receiving antenna 42, the sending control unit 43 does not wirelessly send the second response signal Rs2, which includes the authentication code, via the sending antenna 45.

In this way, if the presence of the electronic key 40 is not detected by the detection unit 18 in step S19 in FIG. 2 (that is, if the verification of the identification code received by the receiving antenna 42 is not successful in step S35 in FIG. 3), the second response signal Rs2, which includes the authentication code, is not wirelessly sent. Therefore, it is possible to eliminate the need for wasteful power consumption that would otherwise be required when the electronic key 40 wirelessly sends the authentication code to a vehicle for which the verification of the identification code is not successful. In addition, since the authentication code is not wirelessly sent and, therefore, the authentication code is not verified, it is possible to eliminate the need for wasteful power consumption that would otherwise be required when the in-vehicle device 11, mounted on a vehicle for which the verification of the identification code is not successful, verifies the authentication code. In addition, since whether to permit or prohibit the locking/unlocking of the door 20 is not determined, it is possible to eliminate the need for wasteful power consumption that would otherwise be required when the in-vehicle device 11, mounted on a vehicle for which verification of the identification code is not successful, determines whether to lock or unlock the door 20.

Although the radio communication system has been described using one embodiment, the present disclosure is not limited to the above embodiment. Various modifications and improvements, such as combinations or replacements with some or all of other embodiments, are possible within the scope of the present disclosure.

For example, the predetermined control is not limited to the locking/unlocking control, but may be another type of control such as lighting control for turning on the lighting system or the blinker.

What is claimed is:

1. A wireless communication system comprising:
   an in-vehicle device mounted on a vehicle, the in-vehicle device including a first sending unit configured to intermittently and wirelessly send an identification code of the vehicle or the in-vehicle device to an outside of the vehicle; and
   a portable device that can be carried by a user, the portable device including:
      a receiving antenna configured to receive the identification code;
      a first verification unit configured to verify the identification code, received by the receiving antenna, with a code registered in the portable device; and
      a sending control unit configured to wirelessly send a response signal if the verification by the first verification unit is successful and not to send the response signal if the verification by the first verification unit is not successful;
   the in-vehicle device further including a detection unit configured to detect a presence of the portable device by receiving the response signal wirelessly sent from the portable device.

2. The wireless communication system according to claim 1, wherein the in-vehicle device is configured to perform predetermined control if the presence of the portable device is detected by the detection unit and not to perform the predetermined control if the presence of the portable device is not detected by the detection unit.

3. The wireless communication system according to claim 2, wherein the in-vehicle device further includes:
   a second sending unit configured to wirelessly send a request signal to the portable device if the presence of the portable device is detected by the detection unit and not to send the request signal if the presence of the portable device is not detected by the detection unit; and
   a second verification unit configured to verify an authentication code received from the portable device with a code registered in the in-vehicle device,
   wherein the sending control unit is configured not to send the authentication code if the request signal is not received and to wirelessly send the authentication code if the request signal is received, and
   the second verification unit is configured to determine whether to permit or prohibit locking or unlocking of a door of the vehicle according to a verification result of the authentication code.

4. The wireless communication system according to claim 1, wherein the first verification unit is configured to change an operation mode of the sending control unit from a standby state to a wake state if the verification of the identification code is successful, the wake state being a state in which a current consumption is higher than a current consumption in the standby state and the response signal can be wirelessly sent.

5. The wireless communication system according to claim 3, wherein the in-vehicle device further includes a locking/unlocking control unit configured to lock/unlock the door of the vehicle according to a result of determining whether to permit or prohibit the locking/unlocking of the door of the vehicle.

6. The wireless communication system according to claim 5, wherein
   the in-vehicle device further includes an operation detection unit configured to detect an operation by the user to lock or unlock the door of the vehicle, and
   the locking/unlocking control unit is configured to output an unlocking request signal or a locking request signal for the door of the vehicle if the locking/unlocking of the door of the vehicle is permitted by the second verification unit and if the operation is detected by the operation detection unit.

7. A wireless communication system comprising:
   an in-vehicle device mounted on a vehicle, the in-vehicle device including an electronic control unit configured to intermittently and wirelessly send an identification code of the vehicle or the in-vehicle device to an outside of the vehicle; and
   an electronic key that can be carried by a user, the electronic key including a receiving antenna, a memory, and an integrated circuit, the electronic key being configured to:
      receive the identification code via the receiving antenna,
      verify the identification code received by the receiving antenna with a code registered in the memory; and
      allow the integrated circuit to wirelessly send a response signal if the verification with the code registered in the memory is successful and not to allow the integrated circuit to send the response signal if the verification with the code stored in the memory not successful;
   the electronic control unit being configured to detect a presence of the electronic key by receiving the response signal wirelessly sent from the electronic key.

8. A wireless communication system comprising:
   an in-vehicle device mounted on a vehicle, the in-vehicle device including a first sending unit configured to intermittently and wirelessly send a unique identification code of the vehicle or the in-vehicle device to an outside of the vehicle; and
   a portable device that can be carried by a user, the portable device including:
      a receiving antenna configured to receive the unique identification code;
      a first verification unit configured to verify the unique identification code, received by the receiving antenna, with a code registered in the portable device; and
      a sending control unit configured to wirelessly send a response signal if the verification by the first verification unit is successful and not to send the response signal if the verification by the first verification unit is not successful;
   the in-vehicle device further including a detection unit configured to detect a presence of the portable device by receiving the response signal wirelessly sent from the portable device.

* * * * *